US012808333B2

(12) United States Patent
Petruzzi et al.

(10) Patent No.: US 12,808,333 B2
(45) Date of Patent: Nov. 24, 2026

(54) FUEL GAS BOOSTER-GAS TURBINE INTEGRATION FOR ENERGY SAVING AND OPTIMIZED OPERABILITY

(71) Applicant: NUOVO PIGNONE TECNOLOGIE—S.R.L., Florence (IT)

(72) Inventors: Luca Petruzzi, Florence (IT); Ever Avriel Fadlun, Florence (IT); Andrea Carnieri, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 19/102,089

(22) PCT Filed: Aug. 8, 2023

(86) PCT No.: PCT/EP2023/025370
§ 371 (c)(1),
(2) Date: Feb. 7, 2025

(87) PCT Pub. No.: WO2024/032933
PCT Pub. Date: Feb. 15, 2024

(65) Prior Publication Data
US 2026/0049580 A1 Feb. 19, 2026

(30) Foreign Application Priority Data
Aug. 8, 2022 (IT) ........................ 102022000016938

(51) Int. Cl.
*F02C 9/26* (2006.01)
*F02C 9/28* (2006.01)
*F02C 9/32* (2006.01)

(52) U.S. Cl.
CPC ................ *F02C 9/263* (2013.01); *F02C 9/28* (2013.01); *F02C 9/32* (2013.01)

(58) Field of Classification Search
CPC .... F02C 3/22; F02C 7/22; F02C 7/236; F02C 9/28; F02C 9/32; F02C 9/263
See application file for complete search history.

(56) References Cited

U.S. PATENT DOCUMENTS 4,922,710 A 5/1990 Rowen et al.
5,606,853 A * 3/1997 Birch ........................ F02C 7/22
60/39.465

(Continued)

FOREIGN PATENT DOCUMENTS

EP 0 661 426 A1 7/1995
EP 0 679 800 A2 11/1995

(Continued)

OTHER PUBLICATIONS

Losilevich, et al., "Applied Mechanics: for Students of Technical Universities", pp. 132-137.

(Continued)

*Primary Examiner* — David P. Olynick
(74) *Attorney, Agent, or Firm* — Paul Frank + Collins P.C.

(57) ABSTRACT

A fuel gas booster-gas turbine integration for energy saving & optimized operability. The fuel gas booster-gas turbine integration comprises an integrated system comprising a reciprocating compressor based fuel gas booster and a gas turbine wherein the gas turbine flow and pressure control system and the fuel gas booster pressure and capacity control system are synchronized to optimize the fuel gas booster power consumption or the fuel gas booster and gas turbine package power consumption, and wherein the gas turbine flow and pressure control system comprises at least one gas turbine fuel gas input control valve and the fuel gas booster control system comprises a gas turbine fuel gas input control valve position controller, associated to said at least one gas turbine fuel gas input control valve, and fuel gas (Continued)

booster capacity control devices, associated to said reciprocating compressor based fuel gas booster.

12 Claims, 1 Drawing Sheet

(56) References Cited

U.S. PATENT DOCUMENTS

| | | | | |
|---|---|---|---|---|
| 6,622,489 | B1 | 9/2003 | Najera et al. | |
| 6,948,919 | B2 * | 9/2005 | Roslund | F04C 29/0085 417/423.7 |
| 9,464,576 | B2 * | 10/2016 | Zhang | F02C 3/04 |
| 2004/0045275 | A1 * | 3/2004 | Tanaka | F02C 9/20 60/39.281 |
| 2021/0396185 | A1 * | 12/2021 | Duscha | F02C 9/46 |

FOREIGN PATENT DOCUMENTS

| | | | |
|---|---|---|---|
| RU | 2403521 | C1 | 11/2010 |
| RU | 2689508 | C1 | 5/2019 |

OTHER PUBLICATIONS

Shangina, et al., “Industrial Robots for Microsized Products”, pp. 150-155.

* cited by examiner

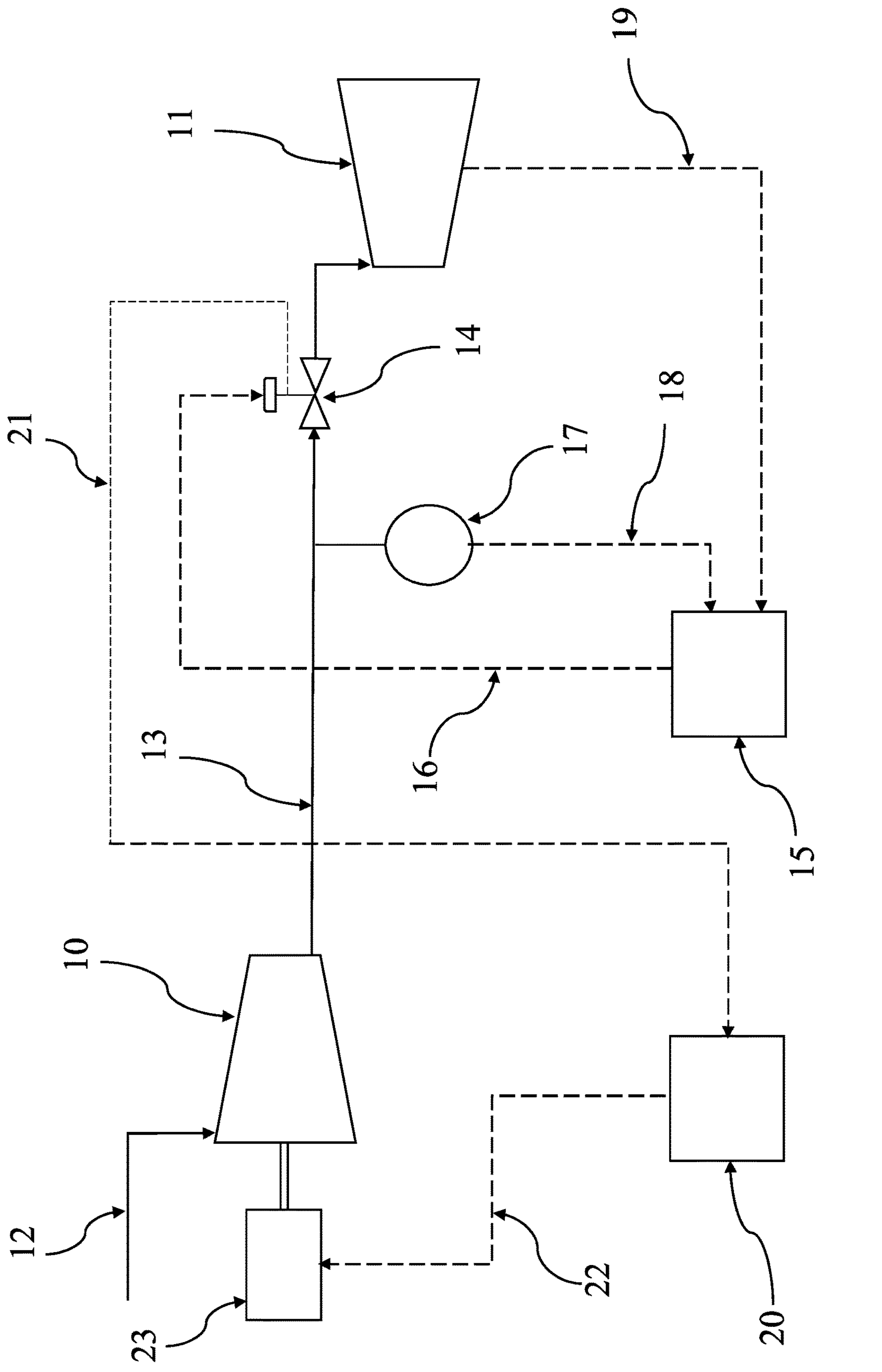
19
11
14
18
17
21
13
16
15
10
12
22
23
20

FUEL GAS BOOSTER-GAS TURBINE INTEGRATION FOR ENERGY SAVING AND OPTIMIZED OPERABILITY

TECHNICAL FIELD

The present disclosure concerns thermodynamic systems and methods. Embodiments disclosed herein specifically concern an integrated system comprising a reciprocating compressor based fuel gas booster and a gas turbine wherein the fuel gas booster pressure and capacity control and the gas turbine flow and pressure control are integrated in order to optimize the reciprocating compressor based fuel gas booster operation. According to the embodiments disclosed herein, the reciprocating compressor based fuel gas booster and the gas turbine system is automatically synchronized at the minimum absorbed power operating point regardless of ambient and fuel gas pressure, temperature, composition change.

BACKGROUND ART

Gas turbines require a certain pressure of fuel gas to combine the fuel gas and pressurized air before combustion. Normally, the gas pressure available from pipelines is not adequate to be delivered at the gas turbine's required pressure. In fact, the gas pressure in the pipeline cannot be maintained at sufficiently high values, due to the higher and higher values of the required gas pressure for high efficiency gas turbines and the more and more increased natural gas demand. This is particularly true for last generation gas turbines (requiring fuel gas pressure values even exceeding 30 bara) and during peak demand such as summertime or daytime, when the gas pressure in the pipeline can gradually decrease and even fluctuate.

In order to properly handle such fluctuating gas pressure from the pipeline while simultaneously meeting the gas turbine's required gas flow rate a fuel gas compressor should be interposed between the pipeline and the gas turbine. This fuel gas compressor is generally called fuel gas booster. Two changeable conditions are most relevant to fuel gas booster: suction gas pressure fluctuation and the turbine's load changes.

U.S. Pat. No. 6,948,919B2 discloses a fuel booster operable to compress a combustible fuel, the fuel booster comprising a compressor housing a compress rotor, and a seal assembly coupled to the compressor housing. The fuel booster also includes a motor having a motor rotor and a motor stator. A variable frequency drive provides power to the motor to control the output pressure and/or flow rate of the compressor. During operation, one or more sensors monitor an engine parameter (e.g., fuel pressure, fuel flow rate, power output, turbine outlet temperature and the like). The rotational speed of the compressor motor is controlled to maintain the engine parameter at a desired value. For example, one system monitors fuel booster discharge pressure (fuel pressure) and varies the speed of the compressor motor to achieve a desired fuel pressure. If the pressure is too high, the speed of the compressor motor is reduced via the variable frequency drive. If the pressure is too low, the compressor motor speed is increased. In another construction, the engine parameter is the fuel flow rate as measured by a fuel flow meter (not shown) positioned downstream of the fuel booster. When the flow rate exceeds a desired value, the variable frequency drive reduces the frequency of the power provided to the compressor motor to reduce the speed of the compressor motor and the flow rate. If the flow rate is too low, the compressor motor speed is increased by the variable frequency drive to increase the flow rate to the desired value. In yet another construction, the turbine outlet temperature is measured, directly or indirectly and the compressor motor speed is controlled to maintain a desired turbine outlet temperature. The aforementioned system controls the output of the compressor without the use of a conventional slide valve.

U.S. Pat. No. 4,922,710A discloses an integrated boost compressor/gas turbine control system in which a fuel gas boost compressor boosts the fuel gas pressure before supplying the fuel gas to the gas turbine control valves, namely the stop/speed ratio or pressure control valve and the gas control or volume valve, which in turn provide the fuel gas to the gas turbine. According to this disclosure, pressure drops through the gas turbine control valves and hence boost power requirements are minimized by driving these valves to a fully open position under normal operating conditions, and using the valves in their normal control mode during other operating conditions such as start up and sudden load rejection. Thus, after startup operation, the system control is transitioned to the minimum system pressure drop of operation utilizing boost compressor flow control in order to control gas turbine fuel flow and hence gas turbine output power.

The afore mentioned systems efficiently controls operations of the gas turbine, but have important limits due to the fuel gas booster electrical consumption, which can even be up to 10% of the total gas turbine rated power.

Moreover, these limits are also evident in the case of reciprocating compressor based fuel gas boosters, which are the preferred kind of compressor applied in the typical size range of fuel gas boosters (<500 kW). In fact, reciprocating compressors allow operation without a lubricant, which is fundamental to avoid oil contamination to the combustion chamber, and very high compression efficiency compared with competitive rotative technology (e.g.: screw compressor).

Accordingly, an improved system and method for operating a reciprocating compressor based fuel gas booster and the gas turbine to address the issues of absorbed power of the current art would be beneficial and would be welcomed in the technology. More in general, it would be desirable to provide methods and systems adapted to more efficiently address problems entailed by the need of increasing the fuel gas pressure and at the same time leading to important energy and operational expenses saving.

SUMMARY

In one aspect, the subject matter disclosed herein is directed to a system wherein integration between a fuel gas booster pressure and capacity control and a gas turbine flow and pressure control allows to optimize a fuel gas booster and gas turbine package operation and power consumption or the fuel gas booster operation and power consumption at a minimum value, when a reciprocating compressor based fuel gas booster is used.

In another aspect, the subject matter disclosed herein concerns a control philosophy that automatically synchronize the fuel reciprocating compressor based gas booster and the gas turbine package at the minimum absorbed power operating point regardless ambient and fuel gas pressure, temperature, composition change.

BRIEF DESCRIPTION OF THE DRAWINGS

A more complete appreciation of the disclosed embodiments of the invention and many of the attended advantages thereof will be readily obtained as the same becomes better understood by reference to the following detailed description when considered in connection with the accompanying drawings, wherein:

FIG. 1 illustrates a schematic of an integrated system comprising a reciprocating compressor based fuel gas booster and a gas turbine according to one embodiment of the present disclosure.

DETAILED DESCRIPTION OF EMBODIMENTS

According to one aspect, the present subject matter is directed to an integrated system comprising a reciprocating compressor based fuel gas booster and a gas turbine wherein the fuel gas booster pressure and capacity control and the gas turbine flow and pressure control are controlled in order to optimize the reciprocating compressor based fuel gas booster operation.

According to one aspect, the reciprocating compressor based fuel gas booster is integrally connected to the gas turbine casing and the booster compressor boosts the pressure and gas fuel. It is used to increase internal energy and generate more power with a smaller gas fuel flow rate.

According to one aspect, the fuel gas booster control system and the gas turbine control system are integrated to automatically synchronize the reciprocating compressor based fuel gas booster and the gas turbine package at the minimum absorbed power operating point regardless ambient and fuel gas pressure, temperature, composition change.

According to a specific aspect, the fuel gas booster control system is operated to reduce capacity in case the gas turbine control system, to optimize the gas turbine operation, sets gas turbine control valves at not fully open position. As a consequence of the fuel gas booster reduced capacity, fuel gas from the reciprocating compressor based fuel gas booster has a lower pressure, allowing the gas turbine control system to set the gas turbine control valves at a fully open position, reducing pressure drop through the gas turbine control valves.

According to one aspect, the fuel gas booster is a reciprocating compressor based fuel gas booster including a plurality of cylinders, each cylinder comprising at least one cylinder effect and the fuel gas booster capacity is controlled by equipping each cylinder effect with a cylinder valve unloader that allows efficient step control (e.g: 4 cylinders compressor with 2 effect per cylinder can managed by 12.5% capacity step regulation).

According to an aspect, the fuel gas booster capacity control can be achieved through an additional variable clearance pocket that can manage capacity variation by increasing and decreasing the individual cylinder clearance pocket with an actuator.

According to other aspects, other devices can be used to manage the compressor valve opening and closing in a way to manage efficient capacity control.

Alternatively, to manage the reciprocating compressor based fuel gas booster capacity, the motor driving the compressor can be equipped with a variable speed system.

Other fuel gas booster pressure and capacity control devices can be used, the technical and commercial effectiveness of different solutions having to be evaluated according to the specific service of the individual reciprocating compressor based fuel gas booster.

According to another aspect, the fuel gas booster control system is configured as a slow control system, in order to minimize any interference with the gas turbine control system. As a consequence, pressure drops through the gas turbine control valves and hence boost power requirements are minimized by driving these valves to a fully open position under normal operating conditions, and the gas turbine control valves are still used to regulate the gas turbine operation in their normal control mode.

According to a specific aspect, the gas turbine control valves are used to regulate the gas turbine operation during start ups and sudden load rejection.

According to another aspect, optimization of the reciprocating compressor based fuel gas booster operation leads to important energy & opex saving.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Referring now to the drawings, FIG. 1 shows a schematic of an exemplary integrated system comprising a reciprocating compressor based fuel gas booster 10 and a gas turbine 11, a fuel gas feed line 12 connecting the inlet of the reciprocating compressor based fuel gas booster 10 to a fuel gas pipeline (not shown) and a compressed fuel gas line 13 connecting the outlet of the fuel gas booster 10 to the inlet of the gas turbine 11. A gas turbine control valve 14 is arranged on the compressed fuel gas line 13 to regulate the gas turbine inlet fuel gas pressure and flow. The gas turbine control valve 14 is operated by a gas turbine control system 15, through a gas turbine control system output line 16. Input to the gas turbine control system 15 comprises a pressure indicator 17, arranged on the compressed fuel gas line 13, upstream the gas turbine control valve 14, and connected to the gas turbine control system 15 through a pressure indicator line 18. Input to the gas turbine control system 15 also comprises a gas turbine flow demand line 19.

A fuel gas booster control system 20 is also present, input to the fuel gas booster control system 20 comprising a gas turbine control valve position indicator line 21. The fuel gas booster control system 20 controls the capacity of the reciprocating compressor based fuel gas booster 10, by means of specific pressure and capacity control devices selected for the specific service amongst, for example: a cylinder valve unloader of any cylinder effect of a plurality of cylinders of the reciprocating compressor, additional variable clearance pocket that can manage capacity variation by increasing and decreasing the individual cylinder clearance pocket with an actuator, a reciprocating compressor inlet valve or a variable frequency drive motor 23, connected to the fuel gas booster control system 20 through a fuel gas booster control system output line 22.

The integrated system of the present invention operates as follows. The fuel gas booster control system 20 continuously detects the position of the gas turbine control valve 14. When the gas turbine control system 15, to optimize the gas turbine operation, sets the gas turbine control valve 14 at not fully open position, then the fuel gas booster control system 20 reduces the capacity of the fuel gas booster, through one of the capacity control devices selected for the specific service. Following the reciprocating compressor based fuel gas booster 10 reduced capacity, fuel gas from the reciprocating compressor based fuel gas booster 10 has a lower pressure, allowing the gas turbine control system 15 to set the gas turbine control valve 14 at a fully open position, reducing pressure drop through the gas turbine control valve 14. As a consequence, the power absorbed by the reciprocating compressor based fuel gas booster 10 is lowered without reducing the gas turbine operability.

In particular, if the fuel gas pressure and/or flow from the reciprocating compressor based fuel gas booster 10 is higher than the pressure and flow actually needed by the gas turbine 11, for example as a consequence of high ambient temperature or reduced turbine load, then the gas turbine control system 15 operates the gas turbine control valve 14 to a not fully open position. The partial closure of the gas turbine control valve 14 causes a pressure drop of the fuel gas before the fuel gas from the reciprocating compressor based fuel gas booster 10 reaches the gas turbine inlet. This implies that part of the compression of the fuel gas operated by the reciprocating compressor based fuel gas booster 10 is lost and, from a different point of view, that the reciprocating compressor based fuel gas booster 10 operates a compression of the fuel gas in excess with respect to the pressure needed by the gas turbine 11. At the same time, the reciprocating compressor based fuel gas booster 10 is absorbing an amount of power in excess with respect to the need. According to the present disclosure, such an amount of absorbed power is saved by reducing the capacity of the reciprocating compressor based fuel gas booster 10 by allowing the reciprocating compressor based fuel gas booster 10 to compress the fuel gas at the pressure required by the gas turbine and minimizing any possible subsequent pressure drop. In fact, within certain limits, a reduction of the pressure of the fuel gas at the inlet of the gas turbine 11 does not negatively affect the operability of the gas turbine 11, in particular in case of reduced load or high temperature. In general, a fuel gas booster is designed to work at 30 bara, but can also work at a lower pressure (down to about 26-27 bara) when the temperature is high (tipically in summertime) or the load is low.

Importantly, according to the present disclosure, since the fuel gas booster control system 20 is used as an additional control system with respect to the gas turbine control system 15, care must be given to avoid interferences between the systems, which could cause instability. In this regard, the fuel gas booster control system 20 is configured as a slow control system, while the gas turbine control system 15 is a fast control system. More in particular, the regulators of the fuel gas booster control system 20 are proportional regulators or proportional-integral regulators with a low proportional gain value. As a consequence, the gas turbine operation and transitory conditions are still controlled by the gas turbine control system 15 without any interference from the fuel gas booster control system 20, while the fuel gas booster control system 20 is only used to regulate the capacity of the reciprocating compressor based fuel gas booster 10.

In particular, the integration of the fuel gas booster control system 20 and the gas turbine control system 15 according to the present disclosure can be used to automatically synchronize the reciprocating compressor based fuel gas booster and the gas turbine package at the minimum absorbed power operating point.

Alternatively, the integration of the fuel gas booster control system 20 and the gas turbine control system 15 according to the present disclosure can be used to minimize the fuel gas booster absorbed power operating point.

In particular, the integration of the fuel gas booster control system 20 and the gas turbine control system 15 according to the present disclosure can be used to reduce the settle-out pressure of a closed circuit in a thermodynamic system following shut-down of a pressure boosting apparatus, such as a compressor, to facilitate startup of the system.

According to a specific implementation of the integration of the fuel gas booster control system 20 and the gas turbine control system 15 of the present disclosure, two fuel gas boosters can be used, the fuel gas boosters being designed to provide a lower pressure and flow than needed by the gas turbine, even down to 50% of the pressure and flow than needed by the gas turbine. This configuration ensures increased availability and reliability in particular conditions, without negatively affect the system in normal operating conditions. For example, since in summertime a gas turbine can operate at full load with a reduced pressure of the fuel gas pressure from the reciprocating compressor based fuel gas booster than only one reciprocating compressor based fuel gas booster of a redundant configuration can be used, while the other is under maintenance).

Finally, the integration of the fuel gas booster control system 20 and the gas turbine control system 15 according to the present disclosure allows for fuel gas booster electric power saves up to 30% (site dependent) and increases reliability and availability to the reciprocating compressor based fuel gas booster minimum load operating in every condition and automatically follow up of ambient and fuel gas booster condition.

While aspects the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

The invention claimed is:

1. An integrated system, comprising:

a first fuel gas booster;

a gas turbine;

a gas turbine control system comprising a first control valve coupled to the gas turbine and to the fuel gas booster; and a fuel gas booster control system comprising a position controller coupled to the first control valve and a capacity control device coupled to the fuel gas booster, the position controller coupled to determine a position of the first control valve, wherein the gas turbine control system and the fuel gas booster control system are synchronized to maintain a minimum power operating point based on the position of the control valve that meets operating requirements of the fuel gas booster and the gas turbine.

2. The integrated system of claim 1, wherein the capacity control device comprises a a variable frequency drive motor.

3. The integrated system of claim 1, wherein the fuel gas booster control system comprises a regulator.

4. The integrated system of claim 1, wherein the fuel gas booster control system comprises a proportional regulator.

5. The integrated system of claim 1, wherein the fuel gas booster control system comprises a proportional-integral regulator.

6. The integrated system of claim 1, wherein the fuel gas booster is integrally connected to a casing of the gas turbine.

7. The integrated system of claim 1, further comprising: a second fuel gas booster.

8. The integrated system of claim 1, further comprising: a second fuel gas booster, wherein the first fuel gas booster and the second fuel gas booster are designed to meet pressure and capacity needs of the gas turbine.

9. The integrated system of claim 1, further comprising: a second fuel gas booster, wherein the first fuel gas booster and the second fuel gas booster are designed to provide pressure and capacity lower than needed by the gas turbine.

10. The integrated system of claim 1, wherein the position of the control valve causes a reduction in booster capacity.

11. A method, comprising:

on an integrated system of claim 1, controlling a position of the first control valve, wherein if the position is less open than a set value, then reducing the fuel gas booster capacity.

12. The method of claim 11, wherein, when a second fuel gas booster is used, if pressure of fuel gas from the first fuel gas booster and the second fuel gas booster is equal to or lower than a maximum pressure that can be provided by one of the first fuel gas booster or the second gas booster individually, then only one of the first fuel gas booster or the second fuel gas booster is used.

* * * * *